(12) United States Patent
Goss et al.

(10) Patent No.: US 9,367,262 B2
(45) Date of Patent: Jun. 14, 2016

(54) ASSIGNING A WEIGHTING TO HOST QUALITY OF SERVICE INDICATORS

(71) Applicant: Seagate Technology LLC, Cupertino, CA (US)

(72) Inventors: Ryan James Goss, Prior Lake, MN (US); Michael Joseph Steiner, St. Paul, MN (US); Mark Allen Gaertner, Vadnais Heights, MN (US); David Scott Ebsen, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 393 days.

(21) Appl. No.: 13/776,896

(22) Filed: Feb. 26, 2013

(65) Prior Publication Data

US 2014/0244892 A1    Aug. 28, 2014

(51) Int. Cl.
*G06F 13/00* (2006.01)
*G06F 3/06* (2006.01)

(52) U.S. Cl.
CPC .............. *G06F 3/0653* (2013.01); *G06F 3/061* (2013.01); *G06F 3/0631* (2013.01); *G06F 3/0685* (2013.01); *G06F 3/0637* (2013.01); *G06F 3/0649* (2013.01)

(58) Field of Classification Search
CPC .............................. G06F 3/0649; G06F 3/0653
USPC ........... 711/102, 151, 156; 709/203, 224, 226
See application file for complete search history.

(56) References Cited

U.S. PATENT DOCUMENTS

| | | | |
|---|---|---|---|
| 6,260,115 B1 | 7/2001 | Permut et al. | |
| 6,963,917 B1* | 11/2005 | Callis et al. | 709/227 |
| 6,965,930 B1* | 11/2005 | Arrowood et al. | 709/223 |
| 7,107,403 B2* | 9/2006 | Modha et al. | 711/129 |
| 7,437,459 B2* | 10/2008 | Chidambaran et al. | 709/226 |
| 7,437,460 B2* | 10/2008 | Chidambaran et al. | 709/226 |
| 7,441,033 B2* | 10/2008 | Chidambaran et al. | 709/226 |
| 7,516,221 B2* | 4/2009 | Souder et al. | 709/226 |
| 7,552,171 B2* | 6/2009 | Chidambaran et al. | 709/203 |
| 7,552,218 B2* | 6/2009 | Kaluskar et al. | 709/227 |
| 7,664,847 B2* | 2/2010 | Colrain et al. | 709/224 |
| 7,747,717 B2* | 6/2010 | Colrain | 709/223 |
| 7,953,860 B2* | 5/2011 | Colrain et al. | 709/227 |
| 8,732,291 B2* | 5/2014 | Zhu et al. | 709/223 |
| 2005/0038833 A1* | 2/2005 | Colrain et al. | 707/203 |
| 2005/0038834 A1* | 2/2005 | Souder et al. | 707/203 |
| 2009/0171706 A1* | 7/2009 | Bobak et al. | 705/7 |
| 2010/0122019 A1* | 5/2010 | Flynn et al. | 711/103 |
| 2011/0225299 A1* | 9/2011 | Nathuji et al. | 709/226 |
| 2012/0016715 A1* | 1/2012 | Brown et al. | 705/7.29 |
| 2012/0239859 A1 | 9/2012 | Lary et al. | |
| 2012/0239860 A1 | 9/2012 | Atkisson et al. | |
| 2013/0030859 A1* | 1/2013 | Jung et al. | 705/7.26 |

* cited by examiner

*Primary Examiner* — Reba I Elmore
(74) *Attorney, Agent, or Firm* — Hollingsworth Davis, LLC (57) ABSTRACT

Quality of service indicators are provided from a host via a host interface. The quality of service indicators relate to data stored in a non-volatile data storage via the host. Workload indicators related to the quality of service indicators are measured, and a weighting is assigned to the host in response to a correlation between the quality of service indicators and the measured workload indicators. The weighting is applied to the quality of service indicators when responding to data access requests from the host.

20 Claims, 5 Drawing Sheets

ASSIGNING A WEIGHTING TO HOST QUALITY OF SERVICE INDICATORS

SUMMARY

The present disclosure is related to assigning a weighting to host quality of service indicators. In one example, methods and apparatuses facilitate receiving, via a host interface, quality of service indicators provided from a host related to data stored in non-volatile data storage via the host. Workload indicators related to the quality of service indicators are measured, and a weighting is assigned to the host in response to a correlation between the quality of service indicators and the measured workload indicators. The weighting is applied to the quality of service indicators when responding to data access requests from the host.

In another example, an apparatus includes two or more non-hierarchical memory units. Each unit is of a different type of non-volatile memory, and at least one of the types of non-volatile memory includes a resistance-based memory. A controller is coupled to the two or more memory units. The controller is configured to at least perform storing quality of service indicators provided from a host related to data stored on the apparatus via the host. Workload indicators related to the stored quality of service indicators are measured, and a weighting is assigned to the host in response to a correlation between the stored quality of service indicators and the measured workload indicators. In response to subsequent host data access requests, the weighting is applied to subsequent quality of service indicators for selecting between the two or more memory units when storing subsequent data.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to persistent data storage devices, such as those devices using solid-state memory storage. Solid state memory storage may include, but is not limited to, magnetic disk, flash memory (e.g., NAND or NOR type memory), resistance-based memories (e.g., resistive random access memory, phase-change memory), and spin-transfer torque random access memory. While each of these memory types may have different characteristics and advantages, effective use of memory devices using the different memory types may involve effectively characterizing workload attributes/indicators associated with host data stored in the devices.

The term "workload attributes" or "workload indicators" refers to time- and location-based characteristics associated with particular units of data that may be measured during normal operation. For example, an indicator may be assigned to a unit of data based on any combination of frequency data is read, frequency data is written/changed, retention time, whether data is accessed sequentially or randomly, etc. The indicators may be determined not only by actions directed to the data unit, but by actions directed to neighboring data units.

The unit of data to which the attributes relate may vary based on what layer of the computing architecture is managing the data storage. For example, a host application may view the data units in terms of files or file system metadata. A lower level host driver may view data units in terms of ranges of logical block addresses (LBNAs). An internal processor of the device may view data units in terms of both logical and physical address ranges.

The present disclosure relates to the characterization and management of workload attributes in persistent data storage devices. Analogous indicators may be communicated from a host device and compared to the workload attributes/indicators. This may be used in a data storage device, such as the device 100 shown in FIG. 1.

Figure 1:
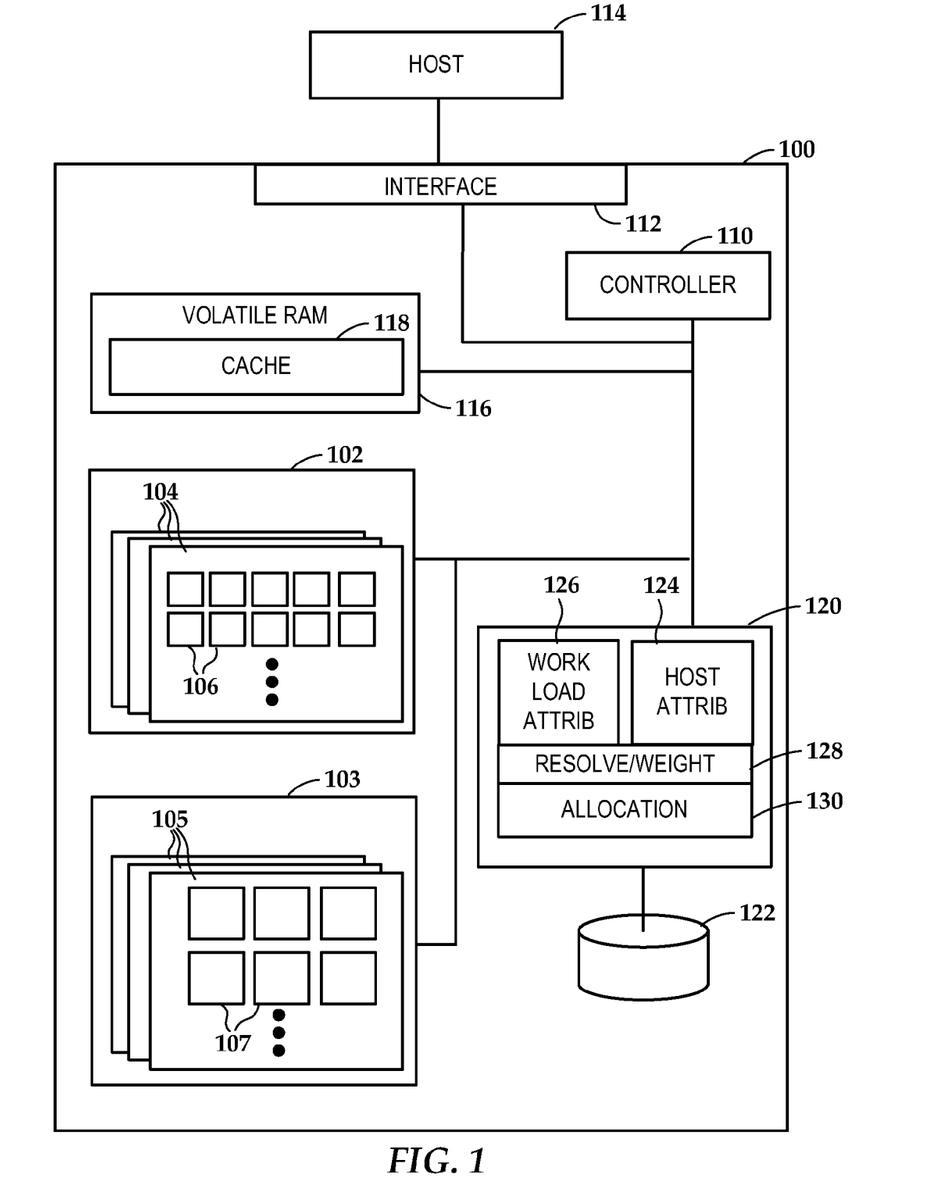
FIG. 1 is a block diagram of an apparatus according to an example embodiment.

In FIG. 1, a block diagram illustrates a data storage device 100 according to an example embodiment. This device 100 may be configured as a solid-state drive (SSD) (or sub-component thereof) that utilizes any combination of solid state memory. The features of the device 100 may be applicable to other types of hard drive devices, such as hybrid drives that use a combination of solid state memory and magnetic disks. The features of the device 100 may also be applicable to special-purpose solid-state and/or disk data storage devices (or sub-components thereof) that do not utilize standard hard drive data interfaces. For example, the device 100 may be configured as part of a host main board infrastructure, e.g., tightly integrated with central processing units (CPUs) and memory controllers of a host 114.

The device 100 includes two or more memory units 102, 103 that contain some or all of the non-volatile memory of the device 100. The memory units 102, 103 may include one or more respective discrete physical units 104, 105 e.g., memory chips. In this example, the memory units 102, 103 are non-hierarchical units, and the respective physical units 104, 105 each contain a different type of non-volatile memory storage media from the other. Within each of the physical units 104, 105, the memory may be grouped into smaller blocks 106, 107. Because the underlying media of the physical units 104, 105 are different, the memory sizes of the blocks 106, 107 may differ. While some of the features of the device 100 are applicable to non-hierarchical mixed-media storage, the concepts may also be employed in devices using a single storage media type, but with different configurations between the units 102, 103 that result in different performance attributes relative to one or more of memory size, read latency, write latency, power consumption, retention time, reliability, etc.

The device 100 may include one or more controllers 110 that facilitate servicing requests received from a host 114 via a host interface 112. The host interface 112 may include a hard drive interface, or other type of computer interface (e.g., memory controller interface, peripheral bus interface). The controller 110 may generally receive read or write requests from the host 114 referencing logical addresses. The controller 110 translates the logical addresses to physical addresses, and performs respective read or write operations on the appropriate physical addresses of the memory units 102, 103.

The memory units 102, 103 may include separate controllers (not shown) that at least performing the encoding, decoding, and other application of signals to the media to perform read/write operations appropriate for the particular memory type. The separate controllers may also perform their own logical-to-physical mapping appropriate to the particular memory architecture. In such a case, the primary controller 110 may transform a logical host address to an internal logical address usable by the memory units 102, 103.

The device 100 may include volatile random access memory (RAM) 116 that may be used for, among other things, a volatile cache 118 for the non-volatile memory units 102, 103. Generally, the volatile cache 118 is a hierarchical memory structure that mirrors portions of the non-volatile memory 102, 103, but can be read from and/or written to more quickly than the non-volatile memory 102, 103. For some situations, e.g., data that sees repeated read/write activity over a short period of time, the volatile cache 118 will increase performance.

As previously noted, memory units 102, 103 are non-hierarchical units that contain a different types of memory storage media. For example, the memory units 102, 103 may each be different ones of flash memory, resistive RAM (ReRAM), spin-torque RAM (STRAM), or phase-change memory (PSM) units. The controller 110 may select data for storage in a particular one of the units 102, 103 based on workload attributes associated with the data. For example, the memory units 102, 103 may have different performance in terms of memory size, read/write latency, read/write throughput, power consumption, retention time, reliability, etc. The host 114 may also target particular data to for storage in the units 102, 103 based on desired performance attributes relative to the stored data. Desired data attributes include need for fast access, frequency of writes/updates, need for reliability, long retention time, sequential or random access, etc.

Generally, it is useful to align the desired data attributes with characteristics of the memory units 102, 103 in which the data is stored. For example, data that is written frequently may be best stored in a high endurance memory type. Data that requires fast access may be best stored in a low read latency memory type. Data that is written infrequently, but needs high reliability, can best be stored in a relatively high latency memory type that has good reliability and retention characteristics. Data may be better or more easily aligned with particular memory sizes. For example, a request size may be matched to a memory page size, or unaligned requests may be match to memories that are better suited for read-modify-write operations (e.g., low read latency, higher endurance).

Because the memory units 102, 103 are non-hierarchical, there is no need for synchronizing redundant data between the units 102, 103 as in a hierarchical cache arrangement. Generally, once a unit 102, 103 is selected for storing the data (e.g., logical addresses of the data are mapped to physical addresses in the selected memory unit 102, 103), the data may remain in that unit for as long as the data is needed. There may be instances when data attributes are re-evaluated and the data is moved from one unit 102, 103 to the other based on the re-evaluation. The re-evaluation may or may not be a regularly scheduled process, e.g., it may occur when the device undergoes significant activity, becomes fuller, experiences increased bit error rates, based on a user request, etc. If during the re-evaluation, current activity affecting data diverges from expected activity based on to the initial classification of the data, the data may be moved.

In the illustrated embodiment, the host 114 may report the desired storage attributes to the device 100, e.g., by signaling via the host interface 114. This signaling may occur as the data is being transferred or at some other time. For purposes of the present disclosure, data used in this signaling of desired attributes will be referred to as a Quality of Service (QoS) indicator.

The QoS indicator may be used to indicate any combination of desired storage attributes described herein, such as the need for fast access, frequency of writes/updates, need for reliability, long retention time, sequential or random access, etc. The QoS indicator may expressly describe the target attribute, e.g., access speed, reliability, randomness, and the like. The QoS indicator may be implicit, e.g., derived from other host provided metadata not related to workload indicators, but from which QoS requirements may be derived. Such implicit QoS indicators may include, but are not limited to, file identifier, host identifier, logical black address range, application name, etc. These implicit indicators may be determined from historical analysis, out-of-band signaling, etc. The host 114 may associate QoS indicators with any unit of stored data, such as logical block address (LBA) ranges, files, directories, applications, etc. The host 114 may communicate the indicators to the device 100 by associating the QoS indicators with logical addresses before, during, or after a host request affecting the logical addresses.

As shown in FIG. 1, the device 100 includes a reserved portion 120 of memory for functional modules operable via the controller 110 and a database 122 for storing persistent data used internally by the device. For example, a host attributes module 124 may monitor QoS indicators received from the host 114 during operation of the device 100. The host attributes module 124 may also store the QoS data in the database 122. The QoS data may be stored in the database using an individual logical address or a range of addresses as an index.

If the host-supplied QoS indicator is always correct about the workload requirements of the data, then there may be no need to store QoS indicators. In such a case, the decision as to where to store the data could be made using the host-supplied QoS indicator, and the QoS indicator could then be safely discarded. However, there may be cases where the host-supplied indicators are incorrect. For example, the host programs or operating systems may be making incorrect assumptions, may be relying on incorrect or sub-optimal default values, etc.

Even in cases where the host-supplied QoS data is correct when the data is first written, the host communication protocol may not have provisions for updating the QoS, e.g., during subsequent reads or updates of the stored data. As a result, some amount of data that was optimally provisioned in one of the memory units 102, 103 when the data was first stored may be sub-optimally provisioned later as use of the data changes over time.

In order to effectively manage host-supplied QoS data, the device 100 includes a workload attributes module 126 that tracks data workload activity over time, and stores indicators of the activity in the database 122. Workload can be determined by monitoring incoming write data and measuring subsequent reads. Workload may also be determined by monitoring temporally associated commands for spatial locality.

Temporal locality involves information that referenced or accessed at one point in time and is likely to be referenced again in the near future. Spatial locality invokes the concept that it is more likely data will be accessed if nearby data was recently accessed. Sequential data is determined when multiple commands have temporal locality that fits a certain spatial locality. This may occur when two or more different sets of LBA ranges (or files) are accessed together as a set (e.g., all the inodes, a file and inode, key plus value, etc.). Workload attributes can be configured as workload associated data sets which are determined by comparing temporally associated commands and grouping commands that have a common temporal affinity.

The workload data is made available to a resolution/weighting module 128 that compares data from the workload attributes module 126 and the host attributes module 124. The resolution/weighting module 128 resolves differences between the QoS indicators provided by the host 114 for particular units of data and workload activity actually measured for those data units. This can be used to create a weighting for the host QoS indicators.

The weightings can be applied by a data allocation module 130 when choosing where to store data in the memory units 102, 103. The weightings may result in the QoS indicators being considered a "hint" that is supplemented by the measured workload attributes. In another example, the QoS indicator could be scaled based on accuracy of previous QoS indicators from the host 114. A single weighting may be applied to all indicators from a particular host 114, or a number of weightings may be used at different levels of granularity, e.g., type of QoS indicator, type of host command, memory range, context of host commands or data, etc.

The weightings can be communicated back to the host 114 via the host interface 112 to aid the host 114 in better data migration/allocation between different memory types. The weightings may be applied to other hints such as data trimming, where a change to mapping state of data is not made due to predicted changes to the data, or where previous internal tracking data is cleared upon a trim of the data set. The weightings may be made in response to background reallocation of data between memory units 102, 103. A background process could occasionally re-check QoS values for existing data, and re-allocate data to if it results in a better use of resources. For example, such a process may cause the demotion of data if the host-supplied QoS suggested it will be frequently accessed, but workload indicators indicate it has not accessed for a long period of time.

Once of aspect the embodiments described herein is that the different layers of abstraction (host files, device, LBA, controller, physical address) may not be needed. For example, the device 100 and controller 110 can operate with more abstract notions of files or objects and thus reduce the number of layers in the system. The notion of this type of communication between host 114 and storage device 100 may be that the device 100 is actually viewed as a part of the host 114, e.g., the operating system and/or kernel-level access is directly understood by the device controller 110 (e.g., like an intelligent DRAM controller). In such a case, the communication of quality of service indicators may be implied by the nature of the request. For example, operating system paging may get high-speed storage, application paging gets lower-speed storage, dynamic linked library (DLL) loading gets medium speed, etc.

Figure 2:
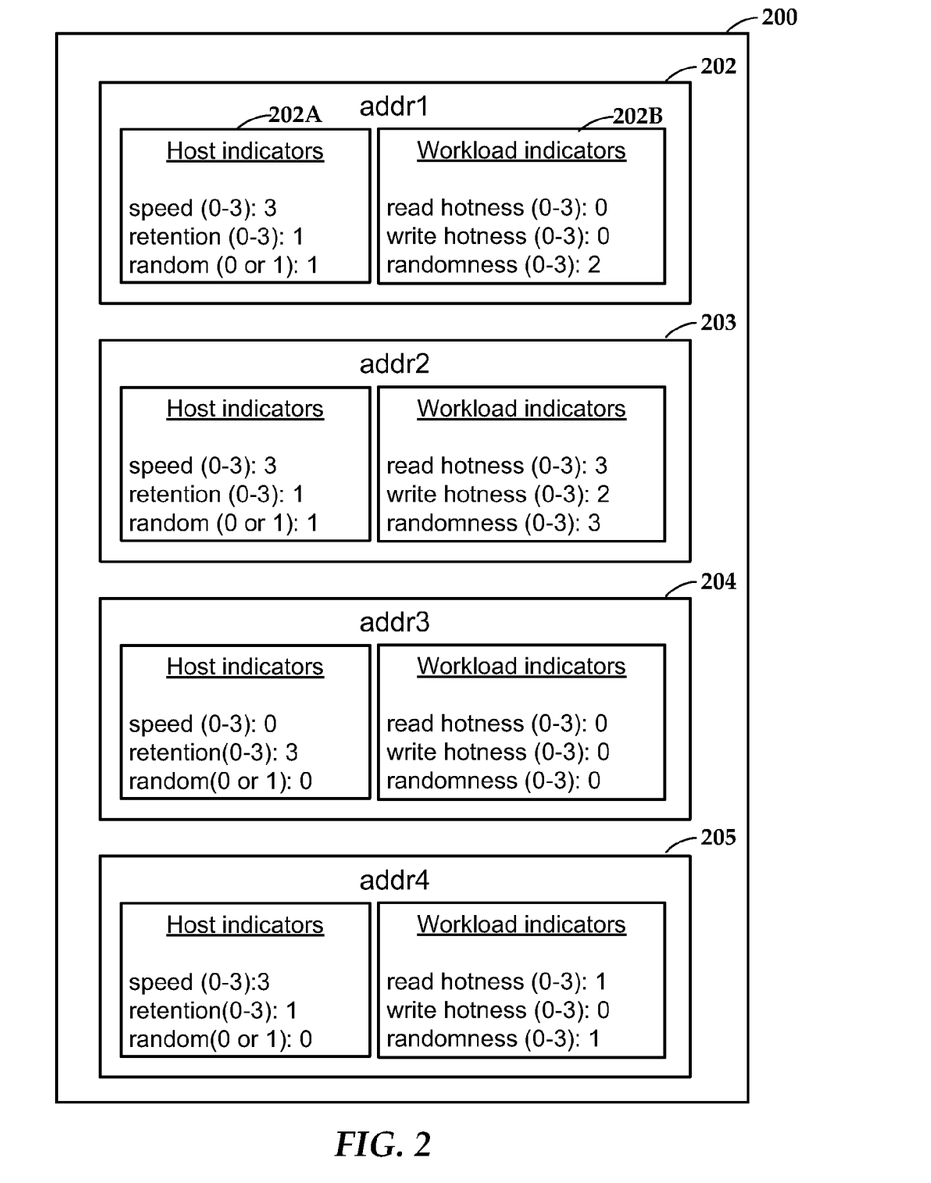
FIG. 2 is a block diagram showing host and workload indicator data according to an example embodiment.

In reference now to FIG. 2, a block diagram illustrates a comparison of an attributes data set 200 according to an example embodiment. Blocks 202-205 represent metadata gathered for four different addresses (e.g., LBAs). The metadata in blocks 202-205 may describe activity associated with an individual address and/or a block of addresses. The data in each block 202-205 is divided into two categories, e.g., host indicators 202A and workload indicators 202B as shown in block 202.

The host indicators 202A includes QoS indicators provided by the host, which in this example relate to speed (e.g., latency, throughput), retention, and whether or not the data is random. The first two of these indicators are specified by two-bit numbers (0-3), and the randomness is a single bit, '1' for random and '0' for sequential. In this example, it is expected that host indicators will use minimal word sizes in order to reduce communications overhead between the host and storage device. However, the present embodiments are not limited to any particular form or word length of the host or workload indicators.

The workload indicators 202B are measured by the storage device. The workload indicators 202B are also shown as two bit numbers for ease of comparison with the host indicators 202A. In practice, the workload indicators 202B may be expressed using greater precision (e.g., 8-bit numbers or higher) because the workload indicators may be mathematically derived from relatively large data sets. In such a case, the workload indicators 202B can be divided into ranges that match the available values of the host indicators 202A.

The workload indicators measured by the device in this example include "read hotness" and "write hotness," which are generally a measure of the number of reads/writes and/or a closeness in time of reads/writes. A high value of read hotness and write hotness indicates a block of data that is subject to a significant amount of activity, and this may or may not be weighted according to how long ago the activity occurred. This may be different than how a read cache or write cache may track activity, because a cache generally needs to only track recent read or write activity. However, for performance purposes, it may be desirable to provide fast access to certain data units that experience repeated bursts of activity, even if the activity occurs relatively infrequently (e.g., only during a system boot).

The device in the example of FIG. 2 also measures how often reads to an address range occur in the same order, as indicated by the randomness workload indicator. A sequential data unit (e.g., a media file) will usually be read back in a predictable order. Other data, such as hard drive metadata (e.g., journal, file allocation table) may be written, read, and/or updated in a random order. Certain data storage types and associated access algorithms may perform relatively better with random data, and others with sequential data.

An analysis module such as resolution/weighting module 128 in FIG. 1 is configured to correlate host indicators 202A with workload indicators 202B. For example, system performance may generally improve if data that experiences frequent or infrequent bursts of activity is placed in a faster storage media. As such, the speed QoS indicator may correlate to the read/write hotness workload indicators. There may be a negative correlation between indicators 202A, 202B. For example, retention in the QoS indicators 202A may be inversely related to write hotness of the workload indicators 202B, because long-term retention may not be a priority for data that is frequently rewritten. An example of this is virtual memory, which may be relied upon for only short periods of time.

In block 202, some of the host indicators 202A do not appear to correlate well with some measured workload indicators 202B. For example, the host has indicated the highest indicator of speed, but read hotness and write hotness indicates the data has not seen significant read/write access since it was first stored. However, the randomness of the data appears to correlate with that indicated by the host, although this parameter may have less effect on performance because in this case the data appears to be little used.

The relevant host indicators in blocks 203 and 204 appear to correlate closely with the measured workload indicators, e.g., high/low speed QoS indicators matching with high/low read/write hotness workload indicators. The read and write hotness indicators in block 205 appear to be contradictory to the host indicators for speed and retention. As a result, it may be concluded that, for this small sample, the host appears to be categorizing random/sequential data well, but may be overestimating the need for access speed and underestimating the need for data retention. As such, the storage system may tend to give host-provided speed and retention indicators less weight in the future when allocating data to different memory units.

Figure 3:
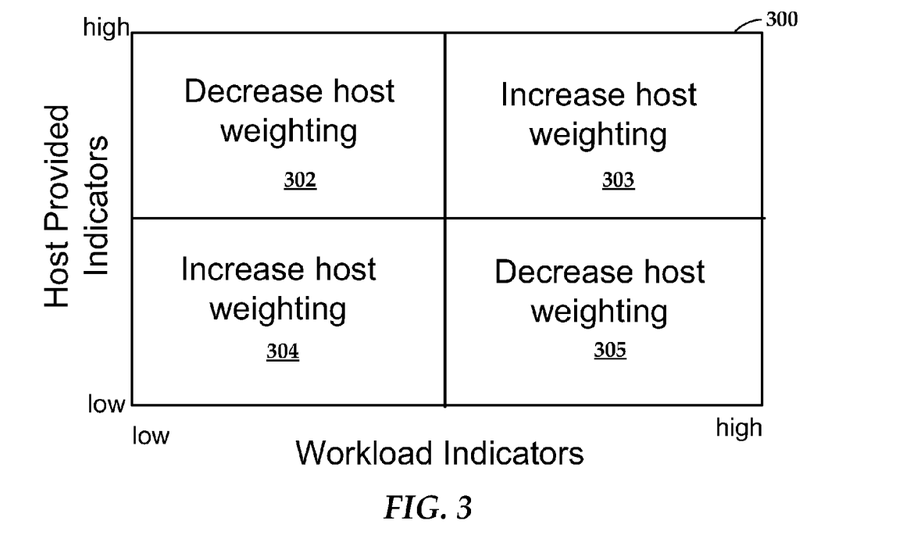
FIG. 3 is a table showing how weightings may be adjusted when comparing workload indicators to host provided indicators according to an example embodiment.

In reference now to FIG. 3, a table 300 illustrates how weightings may be applied in a system according to an example embodiment. The table 300 may be applicable to any metric or indicator provided by a host to a storage device that can be independently evaluated by the storage device. The vertical axis shows host-provided indicators, and the horizontal axis shows measured workload indicators. In this example, the indicators may have a range of values, as seen by the labels "low" and "high" on the horizontal and vertical axes.

Four regions 302-305 in the chart illustrate how the host indicators may be weighted depending on how a host-provided indicator compares to a measured workload indicator. Regions 303 and 304 indicate where the measured workload indicators agree with the host-provided indicators. Region 302 indicates where the host indicator is high compared to the measured workload indicator, and region 304 indicates where the host indicator is low compared to the measured workload indicator.

While the regions 302-305 may provide a general indicator of accuracy of the host-provided indicators, the respective increase or decrease in weightings need not be evenly applied for each region 302-305. For example, if a large majority of the host provided indicators are equally divided between regions 304 and 305, this may indicate the host is predominantly estimating low. If the weighting changes indicated by regions 304 and 305 were applied equally, then the host would have a neutral weighting. However, the correct indications in region 304 may be due to random chance, and so it may be desirable that indicators lying in region 304 have a lesser effect (or no effect at all) on the weighting. A similar analysis may apply to indicators in region 303 and region 302.

If the host consistently estimates low or high, then this may also provide an indication of how host indicators may be interpreted and applied when mapping QoS indicators to different storage units. Using the example speed metric from FIG. 2, if the host was reasonably accurate and there were two memory unit types with different speed attributes, then data having a host-provided speed metric of 0 or 1 would be mapped to the slower of the memory units. Data having a host provided metric of 2 or 3 would be mapped to the faster of the memory units.

The above-described mapping may be adjusted based on the host's weighting. For example, if the host's indicators consistently lie in regions 302 and 303 (host is overestimating need for speed), then data having a host-provided metric of 0-2 would be applied to the slower of the memory units, and data having a host provided metric 3 would be applied to the faster of the memory units. On the other hand, if the host's indicators consistently lie in regions 304 and 305 (host is underestimating need for speed), then data having a host-provided metric of 0 would be applied to the slower of the memory units, and data having a host provided metric 1-3 would be applied to the faster of the memory units.

It will be appreciated that, should the host provide more than one QoS metric, the weightings and corrections to host-provided indicators need not look each metric in isolation. Using the metrics from FIG. 2 as an example, a host may provide accurate retention indicators whenever the speed indicator is low, but may provide inaccurate retention indicators whenever the speed indicator is high. As a result, a decision on where to store data may use a joint decision table, such as in FIG. 4, which shows a joint decision table 400 according to an example embodiment.

Figure 4:
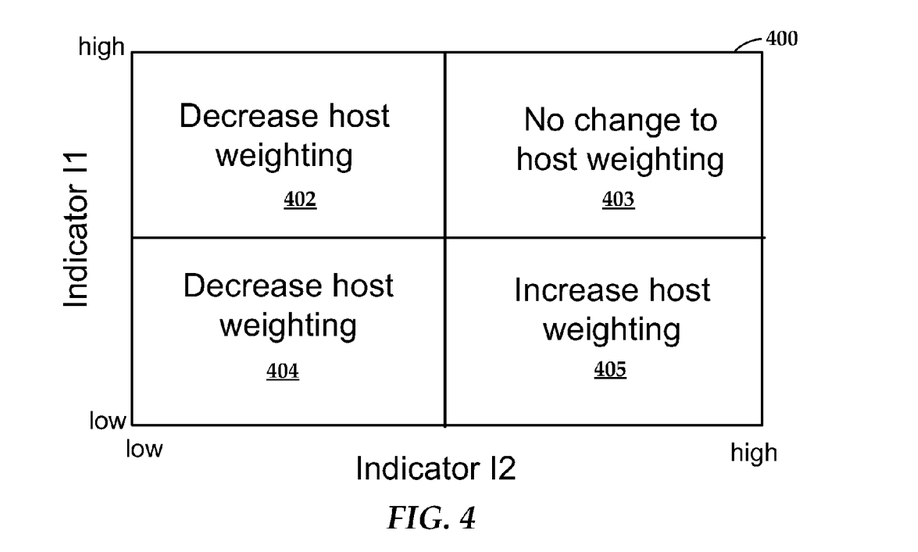
FIG. 4 is a table showing how weightings may be adjusted in view of multiple workload indicators according to an example embodiment.

In FIG. 4, a decision to store a unit in one of two or more memory unit types may depend on two host-provided indicators, I1 and I2. A QoS value Q may be found using $Q=W*(C1*I1+C2*I2)$, where C1 and C2 are scaling constants. If $Q \geq Q_T$, where is $Q_T$ a threshold value, then the data may be placed in one memory unit, and if $Q<Q_T$ then the data may be placed in another memory unit. This may be extended to any number of memory units by using multiple thresholds $Q_T$. The weighting W may be adjusted depending on which quadrant 402-405 of table 400 that the host indicators fall. This may be refined further by setting $Q=W1*C1*I1+W2*C2*I2$. In such a case, each of W1 and W2 are determined/adjusted independently based on the quadrant 402-405 of table 400 in which the host indicators fall.

It will be appreciated that the tables 300 and 400 may be modified to include additional divisions, and such divisions may be linearly or non-linearly sized relative to each other. The tables 300 and 400 may also be used for binary host-provided or workload indicators, with the labels "low"/ "high" replaced with "0"/"1," "true"/"false," etc. Such binary indicators may be used on one or both axes, and may be used together with a multi-value axis in the former case.

Figure 5:
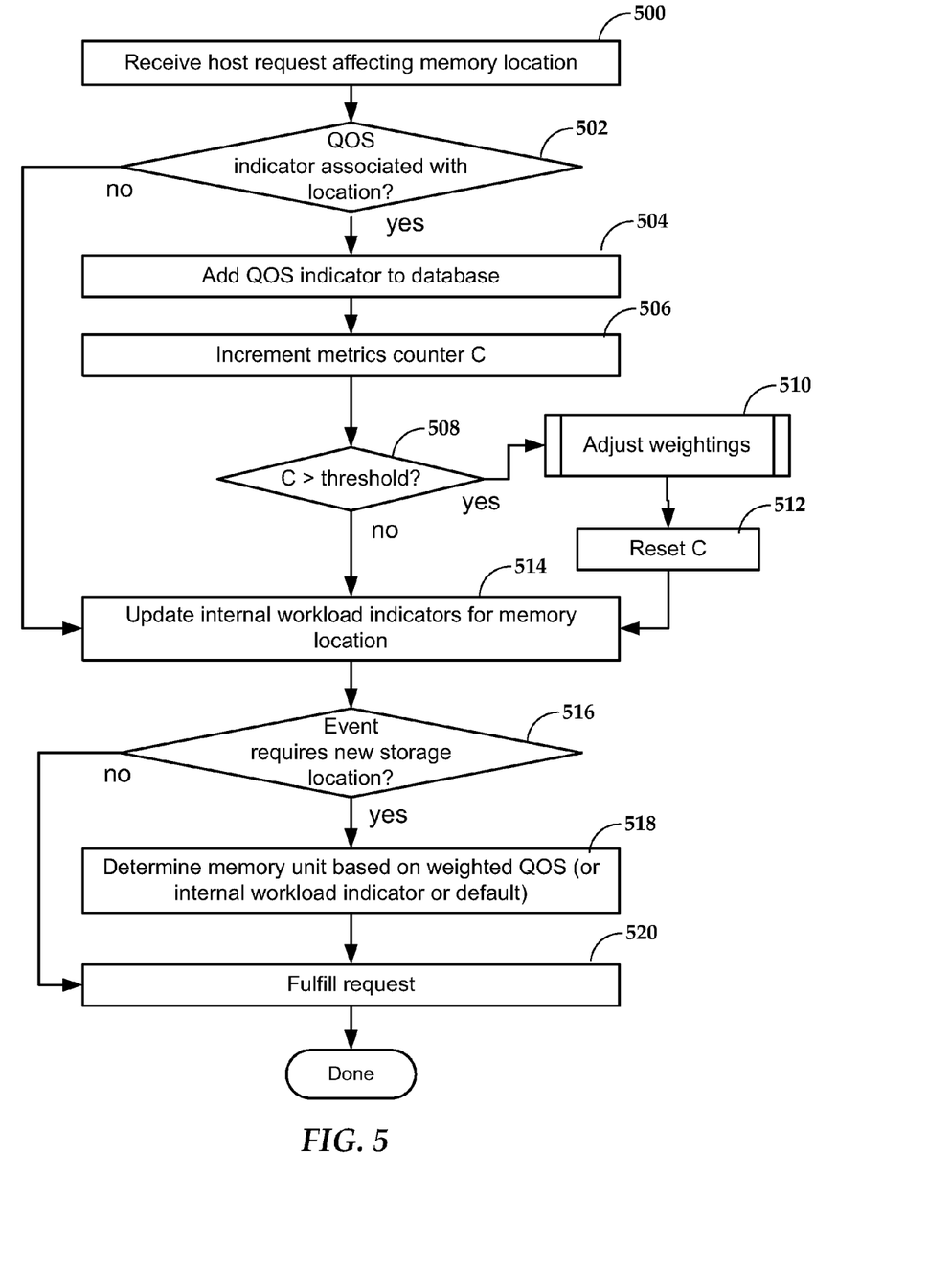
FIGS. 5-7 are flowcharts of methods according to example embodiments.

In reference now to FIG. 5, a flowchart illustrates a procedure according to an example embodiment. The flowchart is triggered by a request received 500 from a host that affects a memory location, e.g., read, write, update. The memory location may include one or more addresses (e.g., a contiguous range). This request may or may not include a QoS indicator, as shown by decision block 502. Some requests, such as reads, may not include a QoS indicator, although may still be important for purposes of tracking internal metrics. If the request does have a QoS indicator, it is added 504 to a database, and a metrics counter is incremented 506.

The metrics counter is intended to occasionally trigger an update of weightings of the host-supplied QoS indicators, although other triggers such as elapsed time may be used. If the metrics counter exceeds a threshold as tested at decision block 508, then the weightings are adjusted using a function 510 that is shown in greater detail in FIG. 6. After the weightings are adjusted 510, the counter is reset 512 to so that the adjustment 510 is not repeated until a desired number of operations have again occurred.

Whether or not QoS indicators were found at block 502, the request may still be used to update 514 internal workload indicators regarding the memory location. For example, if the QoS indicator is only used the first time the data is written, then subsequent read or update operations would not have a QoS indicator, but would still be useful for updating 514 workload indicators. The updated workload indicators can be compared to QoS indicators associated with the address that were provided when the data was written. The workload indicators may be used for other operations as well, such as caching and garbage collection.

If it is determined at decision block 516 that the event requires a new storage location to be defined (e.g., writing new data), then the appropriate memory unit in which to store the data is determined 518 based on a weighted value of the quality of service indicator. In an arrangement where the QoS indicator is optional even for requests for writing new data, then other data such as workload indicators (e.g., indicators associated with other data that is related to the current data by time or address) or a default value may be used at 518 in lieu of a weighted QoS. Even in cases where the QoS is provided, if the host weighting is low enough, the device may use a workload indicator or some other attribute instead of the QoS indicator.

The request is fulfilled 520 before exiting the routine. Fulfilling 520 the request may involve reading, writing, updating, etc., of the target address or addresses. It will be appreciated that the order of these operations may be changed, and some operations performed in parallel. For example, the request may be fulfilled 520 at the beginning of the routine, and other operations performed in parallel or queued for execution at a later time.

Figure 6:
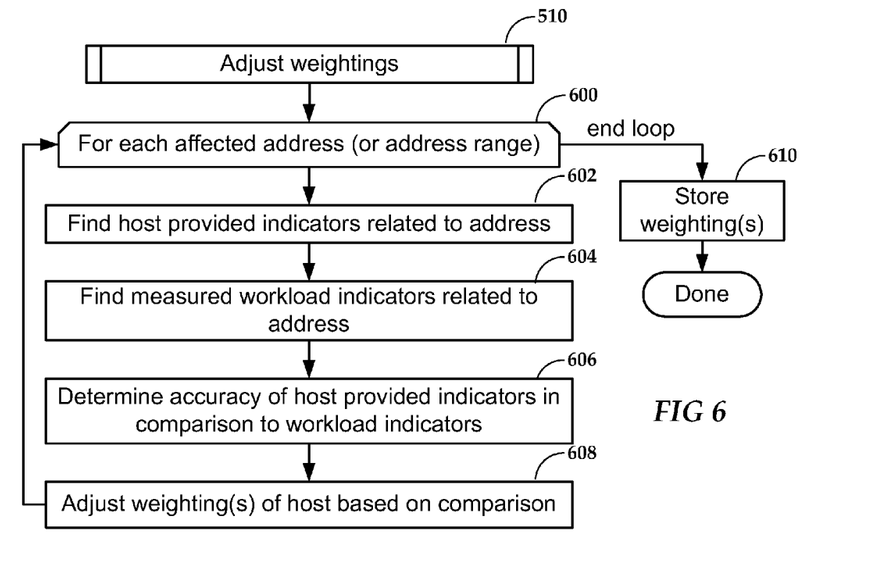

In reference now to FIG. 6, a flowchart illustrates an example of adjustment function 510 from FIG. 5 used to adjust the weighting of the host according to an example embodiment. The procedure involves looping through all addresses which have host-provided attributes, as indicated by loop limit block 600. For example, if host-provided QoS attributes are stored in a database (e.g., database 122 in FIG. 1) indexed by LBA, then a query for all records sorted by LBA may be used to iterate through the loop 600.

For each address in loop 600, host-provided QoS indicators are found 602. For the same address, measured workload indicators are found 604. An accuracy of the host-provided QoS indicators are determined 606 based on a comparison with the workload indicators. This comparison may be numerical, based on a lookup table, or using any other correlation function known in the art. Based on the comparison, the weighting of the host is adjusted 608. The weighting may be applicable to the host as a whole, or may include more than one separate weighting for different host-provided QoS indicators and/or combinations of QoS indicators. After the loop 600 exits, the one or more adjusted or new weightings are stored 610.

The adjusting 608 of the weighting may involve modifying an existing weighting or creating a brand new weighting. For example, each iteration through the loop 600 could add or subtract to an accumulator. After the loop exits but before the weighting is stored 610, the accumulator could be averaged and scaled to the appropriate value, e.g., between 0 and 1. This scaled vale could be combined (e.g., averaged) with a previous weighting if one exists, or could replace any previous weightings.

Figure 7:
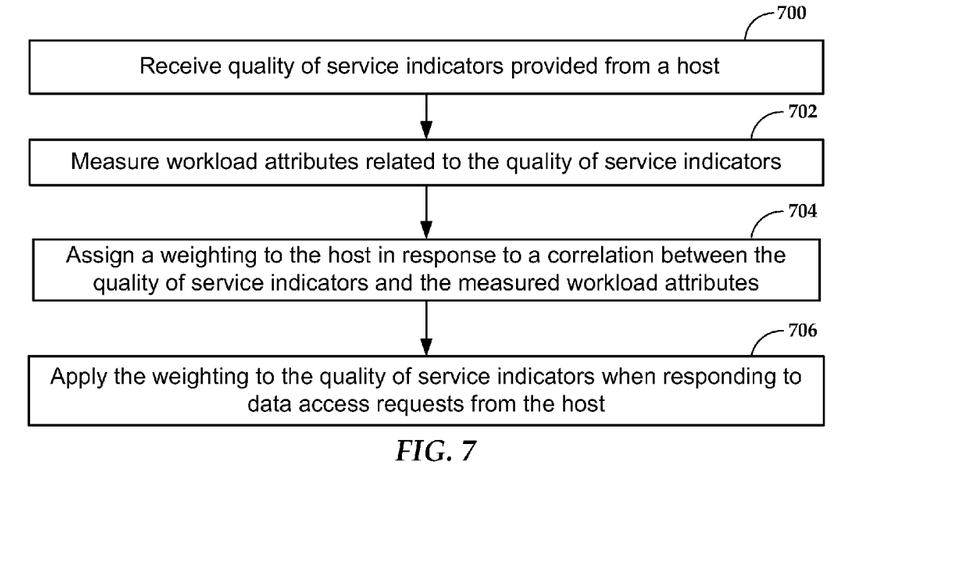

In reference now to FIG. 7, a flowchart illustrates a method according to an example embodiment. The method involves receiving 702 (e.g., via a host interface) quality of service indicators provided from a host. The quality of service indicators are related to data stored in a non-volatile data storage via the host.

Workload attributes related to the quality of service indicators are measured 702, and a weighting is assigned 704 to the host in response to a correlation between the attributes and the monitored workload attributes. The measured workload indicators and quality of service indicators may describe at least one of: a) whether associated data is random or sequential; b) whether associated data is expected to experience at least one of significant read activity and significant write activity; and c) whether associated data is expected to require long data retention times.

The weighting is applied 706 to quality of service indicators when responding to subsequent host data access requests. For example, in response to the weighted subsequent quality of service indicators, memory on which to store subsequent data may be selected from two or more types of non-hierarchical storage of the non-volatile data storage. The two or more types of non-hierarchical storage may be selected, for example, based on having different attributes relative to at least one of memory size, read latency, write latency, power consumption, retention time, and reliability. The weighting may be communicated back to the host, e.g., to assist the host in subsequent categorization of data and use of QoS indicators.

In another arrangement, the quality of service measures may include a range of more than two values. In such a case, applying the weighting to subsequent quality of service indicators involves adjusting a mapping between the range and the two or more types of non-hierarchical storage. At least one of the two or more types of non-hierarchical storage may include a resistance based memory (e.g., ReRAM, PCM).

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a controller capable of being coupled to a non-volatile data storage and a host interface, the controller configured to at least perform:
   receiving, via the host interface, quality of service indicators provided from a host related to data stored in the non-volatile data storage via the host;
   measuring workload indicators related to the quality of service indicators;
   assigning a weighting to the host in response to a correlation between the quality of service indicators and the measured workload indicators; and
   applying the weighting to the quality of service indicators when responding to data access requests from the host.

2. The apparatus of claim 1, wherein responding to data access requests comprises selecting memory from two or more types of non-hierarchical storage of the non-volatile data storage on which to store data from the host based on the weighting.

3. The apparatus of claim 2, wherein the two or more types of non-hierarchical storage are selected based on having different attributes relative to at least one of memory size, latency, throughput, power consumption, retention time, and reliability.

4. The apparatus of claim 2, wherein the quality of service indicators comprise a range of more than two values, and wherein applying the weighting to quality of service indicators comprises adjusting a mapping between the range and the two or more types of non-hierarchical storage.

5. The apparatus of claim 2, wherein at least one of the types of non-hierarchical storage comprise a resistance based memory or a spin torque memory.

6. The apparatus of claim 1, wherein the measured workload indicators and quality of service indicators describe whether associated data is random or sequential.

7. The apparatus of claim 1, wherein the measured workload indicators and quality of service indicators describe whether associated data is expected to experience at least one of significant read activity and significant write activity.

8. The apparatus of claim 1, wherein the measured workload indicators and quality of service indicators describe whether associated data is expected to require long data retention times.

9. The apparatus of claim 1, wherein the quality of service indicators are implied via host provided metadata that is not directly related to the workload indicators.

10. The apparatus of claim 9, wherein the host provided metadata comprises one or more of a host identifier, logical block address range, and file identifier.

11. A method, comprising:
receiving quality of service indicators provided from a host related to data stored in a non-volatile data storage via the host;
measuring workload indicators related to the quality of service indicators;
assigning a weighting to the host in response to a correlation between the quality of service indicators and the measured workload indicators; and
applying the weighting to the quality of service indicators when responding to data access requests from the host.

12. The method of claim 11, wherein storing subsequent data in response to data access requests comprises selecting memory from two or more types of non-hierarchical storage of the non-volatile data storage on which to store data from the host responsive to the weighting.

13. The method of claim 12, wherein the two or more types of non-hierarchical storage are selected based on having different attributes relative to at least one of memory size, latency, throughput, power consumption, retention time, and reliability.

14. The method of claim 12, wherein the quality of service indicators comprise a range of more than two values, and wherein applying the weighting to subsequent quality of service indicators comprises adjusting a mapping between the range and the two or more types of non-hierarchical storage.

15. The method of claim 11, wherein the measured workload indicators and quality of service indicators describe at least one of:
whether associated data is random or sequential;
whether associated data is expected to experience at least one of significant read activity and significant write activity; and
whether associated data is expected to require long data retention times.

16. The method of claim 11, further comprising communicating the weighting back to the host.

17. A non-transitory computer readable medium storing instructions operable by a processor to perform the method of claim 11.

18. An apparatus, comprising:
two or more non-hierarchical memory units, each of a different type of non-volatile memory, wherein at least one of the types of non-volatile memory comprises a resistance based memory;
a controller coupled to the two or more memory units, the controller configured to at least perform:
storing quality of service indicators provided from a host related to data stored on the apparatus via the host;
measuring workload indicators related to the stored quality of service indicators;
assigning a weighting to the host in response to a correlation between the stored quality of service indicators and the measured workload indicators; and
in response to subsequent host data access requests, applying the weighting to subsequent quality of service indicators for selecting between the two or more memory units when storing subsequent data.

19. The apparatus of claim 18, wherein the two or more memory units have different attributes relative to at least one of data access speed, power consumption, retention time, and reliability.

20. The apparatus of claim 18, wherein the measured workload indicators and quality of service indicators describe at least one of:
whether associated data is random or sequential;
whether associated data is expected to experience at least one of significant read activity and significant write activity; and
whether associated data is expected to require long data retention times.

* * * * *